UNITED STATES PATENT OFFICE.

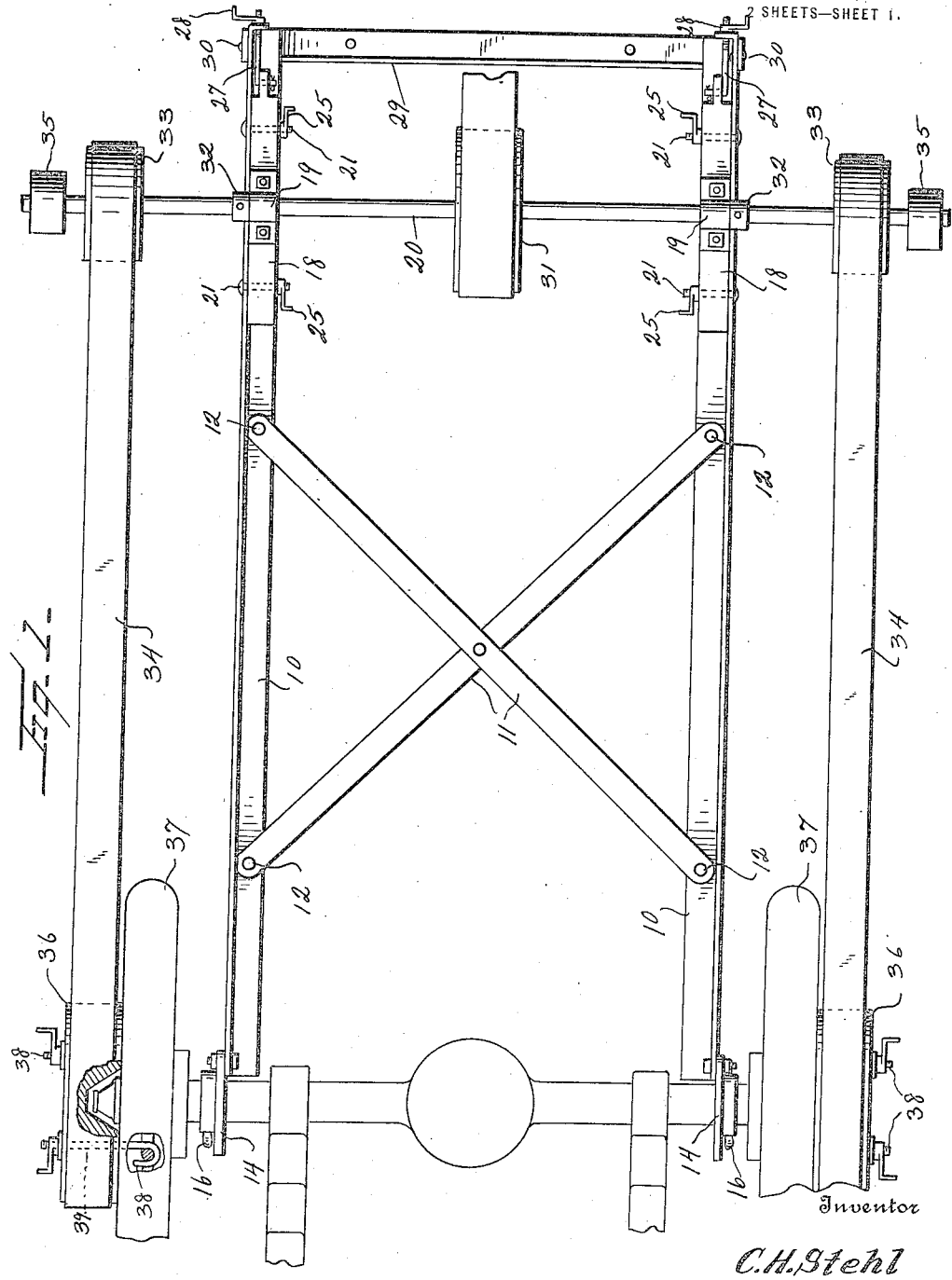

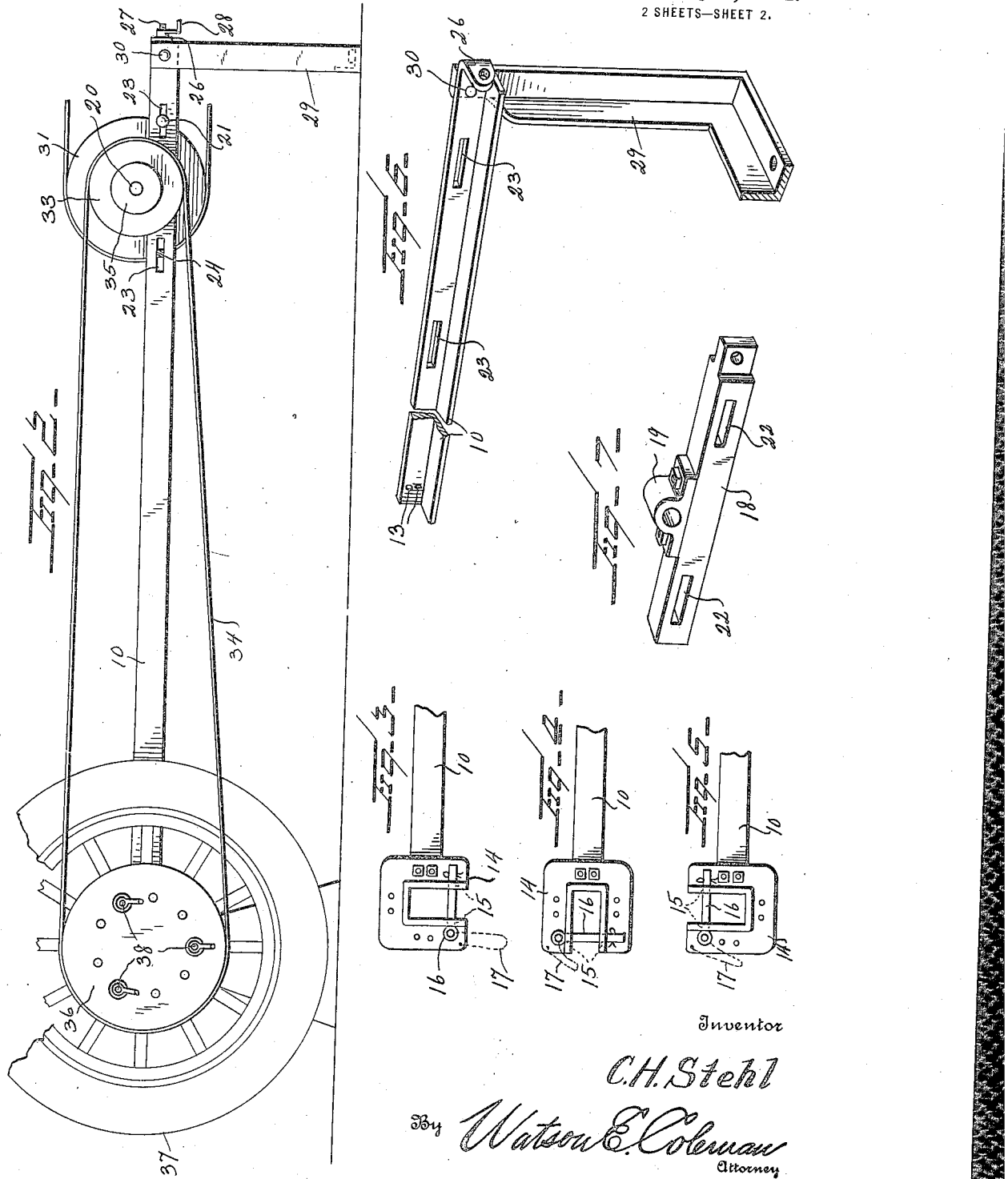

CHARLES H. STEHL, OF TINLEY PARK, ILLINOIS.

POWER TAKE-OFF FOR AUTOMOBILES.

1,424,688.  Specification of Letters Patent.  Patented Aug. 1, 1922.

Application filed January 28, 1922. Serial No. 532,474.

*To all whom it may concern:*

Be it known that I, CHARLES H. STEHL, a citizen of the United States, residing at Tinley Park, in the county of Cook and State of Illinois, have invented certain new and useful Improvements in Power Take-Offs for Automobiles, of which the following is a specification, reference being had to the accompanying drawings.

This invention relates to power take-offs for automobiles, and an important object of the invention is to provide a device of this character which is capable of use with a wide range of vehicles.

A further object of the invention is to provide means whereby the take-off is made adjustable to secure an efficient drive from various makes of automobiles.

These and other objects I attain by the use of the construction shown in the accompanying drawings wherein for the purpose of illustration is shown a preferred embodiment of my invention and wherein like reference characters designate like parts throughout.

In the drawings:—

Figure 1 is a top plan view of a power take-off constructed in accordance with my invention, a portion of one of the driving drums being broken away;

Figure 2 is a side elevation thereof;

Figures 3, 4 and 5 are detail views of the attaching member showing adjusted positions thereof;

Figure 6 is a fragmentary perspective of the frame; and

Figure 7 is a perspective of the bearing block.

Referring now more particularly to the drawings, the numeral 10 indicates angle iron side braces arranged in spaced relation and maintained in such spaced relation by an X brace 11 having the ends of the arms thereof secured to the side braces 10, as at 12.

The forward ends of the vertical portion of the side braces 10 are each provided with a pair of openings 13. The numeral 14 designates U-shaped attaching arms for engaging the axle of an automobile, the U being provided at the bight portion thereof with pairs of spaced openings permitting the arms of the U to be directed upwardly, downwardly or in substantial alignment with the side frames 10. The ends of the arms are provided with aligned openings 15 adapted for the reception of a retaining pin 16 which may be secured to the U-shaped arms 14 by means of a flexible element 17 if so desired.

The side frames 10 are spaced apart a distance which permits their engagement with the axles of practically all standard vehicles, it being understood that certain of the standard vehicles now upon the market have some portion at the rear of the machine which interferes with the insertion of side frames such as shown from one position or another. Such interference is compensated for by the adjustable U-shaped engaging arms 14. If it is impossible to reach the axle from above, the arms are directed upwardly and engaged about the axle and the pin 16 inserted. If it is possible to engage the retaining arms with the axle by a downward movement, the arms are directed downwardly, and where engagement of either of these systems is impossible, the arms are directed in substantial alignment with the side frames 10. I have found that by providing these three adjustments the frames can be secured to practically any of the standard vehicles now on the market.

Slidably mounted upon the horizontally disposed portion of each of the angle iron side frames 10 adjacent the rear ends thereof are blocks 18 each having secured thereto a bearing 19, through which bearings a shaft 20 is directed. The blocks are secured to the angle iron side frames by bolts 21 extending through longitudinally elongated openings 22 formed in the blocks and similar openings 23 formed in the angle iron side frames, the bolts being headed and having a squared portion operating in the angle iron side frames, as indicated at 24. The bolts are likewise provided with lever nuts 25 which may be tightened against the blocks 18 to prevent movement thereof with respect to the angle iron side frames.

A portion of the rear end of each of the angle iron side frames 10 is bent inwardly to form an ear 26 having an opening therethrough through which is directed a screw 27 secured to the adjacent end of the corresponding block. A lever nut 28 is mounted upon each of the screws 27 to permit adjusting of the associated block and bearing. A U-shaped stand frame 29 is provided having the ends of the arms thereof pivotally secured, as at 30, to the rear ends of the side frames 10, the bight portion of the frame 29 being preferably provided with openings for the reception of securing elements whereby it may be secured to the floor or ground.

Secured to the shaft 20, intermediate the frames 10, is a drive pulley 31, the shaft being provided with collars 32 abutting the outer face of each bearing. Exteriorly of the bearings the shaft has secured thereto pulleys 33 adapted for the reception of driving belts 34 to be driven by the automobile or vehicle. The shaft may likewise have secured thereto light work pulleys 35 which are arranged exteriorly of the bearings.

A pulley 36 is secured to each drive wheel 37 of the vehicle. These pulleys are preferably of the laminated type and provided with a tapered opening for the reception of the hubs of the automobile wheels. Hook members 38 are provided, adapted to engage with the spokes of the vehicle and having their shanks threaded and directed through openings 39 formed in the pulleys, a plurality of these hook members being provided. A washer is seated upon the shank of each hook member at the outer face of the pulley and a lever nut applied thereto so that the pulley may be firmly tightened against the wheel hub.

It will be seen that when the pulley is applied in position the belts 34 may be applied and tightened by rotation of the lever nuts 28 through which action the bearings of the shaft 20 are shifted toward or away from the pulleys 36. This adjustment likewise renders application of the belts very easy, as the bearings may be shifted toward the pulleys or drums 36 and the belts applied and the bearings subsequently shifted away from these drums. It will be seen that the construction provided permits of a wide range of adaptability in the application of the device and at the same time a very strong and cheap power take-off attachment is afforded. It will furthermore be obvious that many changes are possible in the construction hereinbefore set forth without in any manner departing from the spirit of my invention and I accordingly do not limit myself to the specific structure thereof except as hereinafter claimed.

I claim:

1. In a power take-off device for self propelled vehicles, spaced side frames, a drive receiving and transmitting shaft carried by the frames, and means for securing the frames to the vehicle embodying a U-shaped member attached to the end of each of said side frames and shiftable to direct the arms thereof upwardly, downwardly or in alignment with the side frames.

2. In a power take-off device for self propelled vehicles, spaced side frames, a drive receiving and transmitting shaft carried by the frames, means for securing the frames to the vehicle embodying a U-shaped member attached to the end of each of said side frames and shiftable to direct the arms thereof upwardly, downwardly or in alignment with the side frames, aligned openings formed in the ends of the arms of each of said U-shaped members, and pins engageable in said openings.

3. In a power take-off device for self propelled vehicles, spaced side frames, a drive receiving and transmitting shaft carried by the frames and adjustable thereon, means for securing the frames to the axle of the vehicle embodying a U-shaped member attached to the end of each of said side frames and shiftable to direct the arms thereof upwardly, downwardly or in alignment with the side frames, and means for locking the transmitting shaft in adjusted position upon the frame.

4. In a power take-off device and in combination with a self propelled vehicle, spaced side frames, means for attaching one end of said side frames to the vehicle, a block slidably mounted on each of said side frames adjacent the opposite end thereof, slots formed in said side frames and blocks, headed elements extending through the slots of the side frames and blocks and having squared portions engaging in the slots of the side frames, lever nuts mounted on said headed elements and abutting said blocks, means for adjusting the blocks longitudinally of the side frames, bearings carried by the blocks, and a shaft mounted in said bearings.

5. In a power take-off device and in combination with a self propelled vehicle, spaced side frames, means for attaching one end of said side frames to the axle of the vehicle, blocks slidably mounted on each of said side frames adjacent the opposite ends thereof, the material of the side frames at the last named end being bent to form ears, a threaded element engaged with each of said blocks and extending through an opening formed in the corresponding ear, a lever nut engaged with said threaded element and abutting the ear, means for locking the blocks in adjusted position, bearings carried by said blocks, and a shaft mounted in said bearings.

In testimony whereof I hereunto affix my signature.

CHARLES H. STEHL.